United States Patent [19]
Sugiura

[11] Patent Number: 5,928,509
[45] Date of Patent: Jul. 27, 1999

[54] BUBBLE FLOATING TYPE SEPARATOR

[75] Inventor: Hikoroku Sugiura, Funabashi, Japan

[73] Assignees: Hikoroku Sugiura; Kazumi Uchida; Seiji Suzuki; Nobumoto Isozaki, all of, Japan

[21] Appl. No.: 08/925,224

[22] Filed: Sep. 8, 1997

[30] Foreign Application Priority Data

Sep. 11, 1996 [JP] Japan .................................. 8-262547

[51] Int. Cl.$^6$ ............................ B03D 1/24; B04C 5/103; B04C 5/12; B04C 5/14
[52] U.S. Cl. ...................... 210/221.2; 210/199; 210/205; 210/206; 210/194; 210/512.1; 210/266
[58] Field of Search ............................ 210/221.2, 221.1, 210/512.1, 199, 205, 206, 194, 266; 209/170, 727, 732, 734

[56] References Cited

U.S. PATENT DOCUMENTS

| | | |
|---|---|---|
| 1,155,816 | 10/1915 | Higgins . |
| 2,706,045 | 4/1955 | Large . |
| 4,094,783 | 6/1978 | Jackson . |
| 4,214,982 | 7/1980 | Pfalzer . |
| 4,560,474 | 12/1985 | Holik . |
| 4,952,308 | 8/1990 | Chamberlain . |
| 4,971,685 | 11/1990 | Stanley . |

FOREIGN PATENT DOCUMENTS

| | | |
|---|---|---|
| 4-166280 | 6/1992 | Japan . |
| 95/21698 | 8/1995 | WIPO . |

*Primary Examiner*—Thomas M. Lithgow
*Attorney, Agent, or Firm*—Bachman & LaPointe, P.C.

[57] ABSTRACT

There is provided a new bubble floating type separator applicable to a waste water regeneration system which can purify a relatively small amount of waste water by a simple and small-scaled apparatus. The bubble floating type separator comprises a liquid passage for delivering a liquid which contains suspended solids, and an injection pipe, connected to said liquid passage, for injecting a gas selected from air, oxygen gas and ozone gas. A gas-liquid mixer is connected to the liquid passage at a downstream portion of the injection pipe, and a cyclone type bubble separator is connected to a downstream portion of an outlet of the gas-liquid mixer. The cyclone type bubble separator has a discharge port, at a central upper portion, for discharging bubbles floating along with the suspended solids, a cyclone body, and a liquid discharge port at a lower circumferential portion of the cyclone body for discharging a processed liquid so that the suspended solids are removed together with the bubbles.

4 Claims, 5 Drawing Sheets

BUBBLE FLOATING TYPE SEPARATOR

BACKGROUND OF THE INVENTION

The present invention relates in general to a bubble floating type separator, and more particularly to a bubble floating type separator suitable for use in a regeneration (repurification) system which regenerates (or re-purifies) waste water or drain discharged from many industrial fields into semi-cleaned water and/or cleaned water.

Many attempts have been made, in the field of the waste water regeneration system as described above, to provide a simple and fundamental system by simply depositing or sedimenting mixtures which have larger specific gravity in a sediment tank, or by screening mixtures having larger particle size with the use of a meshed screen, and to provide more advanced system such as an active sludge processor. These conventional systems are successfully used for regeneration of waste water as long as the water to be regenerated is limited to a small amount. A large amount of the industrial waste water which is continuously discharged, however, is not successfully regenerated by relatively simple-structured system which can be used by small industrial entities but only purified to the extent that it can be only discharged to the natural environment, although such a large amount of waste water can be regenerated reliably to a high and desired level of purification by a large scaled system with complex processes and structures.

Another attempt has been proposed to provide a system which can regenerate a part of the waste water so that the regenerated water can be sued as semi-purified water. This attempt, however, provides serious problems that it needs a relatively large scale of apparatus, substantial difficulties in operation, and/or a high running cost.

Specifically, if a waste water at car-wash stations, gas stations, etc. can be regenerated only to an extent of the semi-purified condition, a large amount of water resources can be re-used effectively. At present, however, it is inevitable that a cost for regeneration of the waste water is higher than the service water and, accordingly, this is the main reason that a regeneration system of the waste water has not been prevailed or used extensively.

Further, an apparatus called "pulper" has long been used for removing ink and the like from waste paper. The pulper incorporates a bubble floating type separator so as to dissolve the waste paper and agitate the same to produce foams, and proceed a gravity separation of the ink which is floating together with the bubbles, and the pulper has proved a good evaluation of easy operation and less operational power.

In view of the foregoing, the bubble floating type separator as the pulper is applicable to a simple and small-scaled regeneration system of the waste water in a sense, but in the other sense, it provides problems and difficulties in effective mixture of the bubbles and effective removal of the thus mixed bubbles by a simple and small-scaled system.

SUMMARY OF THE INVENTION

Accordingly, an object of the present invention is to provide a new bubble floating type separator which can be applied to a waste water regeneration system, in which the waste water regeneration system can purify a relatively small amount of waste water by a simple and small-scaled apparatus.

According to a first aspect of the present invention, there is provided a bubble floating type separator comprising:

a liquid passage for delivering a liquid containing therein suspended solids, an injection pipe, connected to the liquid passage, for injecting a gas selected from air, oxygen gas and ozone gas, a gas-liquid mixer connected to a downstream portion of the injection pipe of the liquid passage, a cyclone type bubble separator connected to a downstream portion of an outlet of the gas-liquid mixer, wherein the cyclone type bubble separator has:

(1) a discharge port, at a central upper portion, for discharging bubbles floating along with the suspended solids, (2) a cyclone body, and (3) a liquid discharge port, at a lower circumferential portion of the cyclone body, for discharging a processed liquid.

By the construction described above, when a gas is injected from the injection pipe into the liquid, which contains suspended solids as the waste water, and mixed by the gas-liquid mixer, the gas turns into small bubbles which in turn are adhered to the suspended solids in the waste water. Then, an apparent specific gravity of the suspended solids with the bubbles adhered thereto becomes smaller, with the result that the suspended solids float.

Accordingly, if the gas-liquid mixture is left, the suspended solids ben be separated due to a gravity separation, by the effect of a "bubble-separation" in such a manner that the suspended solids are captured by and floated by the adhered bubbles are then separated. For this purpose, a substantial residence time is needed and, therefore, a large scaled residence tank or basin is needed. In view of the above, in the present invention, the cyclone type bubble separator is used for the bubble separation, with the result that the suspended solids which float along with the bubbles can be separated within a shorter period of time.

According to a second aspect of the present invention, there is provided a bubble floating type separator comprising:

a liquid passage for delivering a liquid containing therein suspended solids, an injection pipe, connected to the liquid passage, for injecting a gas selected from air, oxygen gas and ozone gas, a diameter-enlarged passage portion connected to the liquid passage at a downstream portion of the injection pipe of the liquid passage, a gas-liquid mixer, within the diameter-enlarged portion, having a fluid collision plate so that a residual passage in the diameter-enlarged portion has a larger area than a sectional area of the liquid passage, a cyclone type bubble separator connected to a downstream portion of an outlet of the gas-liquid mixer, wherein the cyclone type bubble separator has:

(1) a discharge port, at a central upper portion, for discharging bubbles floating along with the suspended solids, (2) a cyclone body, and (3) a liquid discharge port, at a lower circumferential portion of the cyclone body, for discharging a processed liquid.

In the construction of the second embodiment of the invention, the diameter-enlarged portion is disposed at a downstream of the injection pipe of the liquid passage, and the gas-liquid mixer which has a fluid collision plate is provided within the diameter-enlarged portion so that a residual passage in the diameter-enlarged portion has an area which is larger than a sectional area of the above-described liquid passage. Accordingly, a pressure loss can be minimized, and the liquid and gas can be effectively mixed together so that the liquid and gas become temporarily an emulsified condition and, consequently, very small suspended solids can be by the aforementioned bubble separation.

Generally it is known that use of the fluid collision plate provides a large pressure loss. In the present invention, the fluid collision plate is disposed in the diameter-enlarged portion and, accordingly, the inner pressure of the diameter-enlarged portion is reduced due to an orifice effect. Thus, the collision is effected in the pressure-reduced circumstances and, accordingly, an increase of the pressure loss due to the collision can be minimized. The operation of the gas-liquid mixer will be described presently.

According to a third aspect of the present invention, there is provided a bubble floating type separator comprising:

a liquid passage for delivering a liquid containing therein suspended solids, an injection pipe, connected to the liquid passage, for injecting a gas selected from air, oxygen gas and ozone gas, a diameter-enlarged passage portion connected to the liquid passage at a downstream portion of the injection pipe of the liquid passage, a gas-liquid mixer, within the diameter-enlarged portion, having a fluid collision plate so that a residual passage in the diameter-enlarged portion has a large area than a sectional area of the liquid passage, a cyclone type bubble separator connected to a downstream portion of an outlet of the gas-liquid mixer, wherein the cyclone type bubble separator has:
(1) a cylindrical cyclone body,
(2) a liquid inlet, at an upper circumferential portion of the cyclone body, for feeding a liquid towards a tangential inner portion of the cyclone body,
(3) a revolving flow block and a bubble outlet at a top central portion of the cyclone body,
(4) an inner bottom plate at a lower inner portion of the cyclone body with a predetermined gap relative to an inner circumferential surface of the cyclone body, and
(5) a liquid outlet, at a circumferential surface below the inner bottom plate, for discharging the processed liquid.

In the third aspect of the present invention, the clone type bubble separator has a liquid inlet at an upper circumferential portion of the cyclone body for the purpose of feeding a liquid towards a tangential inner portion, and a revolving flow block plate and a bubble outlet are provided at a top central portion of the cyclone body. Further, this separator has an inner bottom plate at a lower inner portion of the cyclone body with a gap between the end thereof and the circumferential surface of the cyclone body, and a liquid outlet at a circumferential surface which is below the inner bottom plate so that the processed liquid can be discharged from this liquid outlet.

By this construction, the bubbles in the liquid can be separated at the atmospheric pressure quite effectively and without using a negative pressure which has generally been used in the conventional gas-liquid separation technology. At the same time of the bubble separation, the suspended solids in the liquid can be removed by the bubble separation. An operation of the cyclone type bubble separator will be described presently in detail.

According to a fourth aspect of the present invention, there is provided a bubble floating type separator comprising:

a cylindrical cyclone body, a liquid inlet, at an upper circumferential portion of the cyclone body, for feeding a liquid containing therein suspended solids and a liquid containing therein bubbles towards a tangential inner portion of the cyclone body, a revolving flow block for blocking a revolving flow and a bubble outlet at a top central portion of the cyclone body, an inner bottom plate at a lower inner portion of the cyclone body with a predetermined gap relative to an inner circumferential surface of the cyclone body, the inner bottom plate having an inverted-umbrella shape with its central portion projecting downwardly, and a liquid outlet, at a circumferential surface below the inner bottom plate, for discharging the processed liquid.

Accordingly, the inverted-umbrella shaped inner bottom plate permits the revolving flow to be maintained, without attenuation, to the level below the inner bottom plate so that a bubble separation effect can be increased. In other words, the bubble separation effect is maintained at the lower portion of the cyclone body.

According to a fifth aspect of the present invention, there is provided a bubble floating type separator comprising:

a cylindrical cyclone body, a liquid inlet, at an upper circumferential portion of the cyclone body, for feeding a liquid containing therein suspended solids and a liquid containing therein bubbles towards a tangential inner portion of the cyclone body, a revolving flow block for blocking a revolving flow and a bubble outlet at a top central portion of the cyclone body, an inner bottom plate at a lower inner portion of the cyclone body with a predetermined gap relative to an inner circumferential surface of the cyclone body, the inner bottom plate having an inverted-umbrella shape with its central portion projecting downwardly, a liquid outlet, at a circumferential surface below the inner bottom plate, for discharging the processed liquid, a circulation passage connected to the liquid outlet through a pump means for circulating a part of the processed liquid, and a second inlet, at an immediate above portion of the inner bottom plate at the circumferential surface of the cyclone body, and connected to a downstream end of the circulation passage so that the processed liquid is fed to the tangential inner portion of the cyclone body.

In the fifth aspect of the invention, revolving flows are provided at both upper and lower portions in the cyclone body, and the inverted-umbrella shaped bottom plate can generate revolving flows at the entire area of the upper and lower portions, so that a bubble separation can be made efficiently.

According to a sixth aspect of the present invention, there is provided a bubble floating type separator comprising:

a cylindrical cyclone body, a liquid inlet, at an upper circumferential portion of the cyclone body, for feeding a liquid containing therein suspended solids and a liquid containing therein bubbles towards a tangential inner portion of the cyclone body, a revolving flow block for blocking a revolving flow and a bubble outlet at a top central portion of the cyclone body, an inner bottom plate at a lower inner portion of the cyclone body with a predetermined gap relative to an inner circumferential surface of the cyclone body, a second liquid outlet, at a lower circumferential portion of the cyclone body and at a portion above the inner bottom plate, for feeding the liquid to the inner tangential portion of the cyclone body, and a liquid outlet, at a circumferential surface below the inner bottom plate, for discharging the processed liquid.

In the sixth aspect of the invention, the revolving flow is enhanced in the midst of the flowing and, therefore, revolving flows of a sufficient strength for capturing the bubbles can be maintained.

According to a seventh aspect of the present invention, there is provided a bubble floating type separator comprising:

a cylindrical cyclone body, a liquid inlet, at an upper circumferential portion of the cyclone body, for feeding a liquid containing therein suspended solids and a liquid containing therein bubbles towards a tangential inner portion of the cyclone body, a revolving flow block for blocking a revolving flow and a bubble outlet at a top central portion of the cyclone body, an inner bottom plate at a lower inner portion of the cyclone body with a predetermined gap relative to an inner circumferential surface of the cyclone body, a liquid outlet, at a circumferential surface below the inner bottom plate, for discharging the processed liquid, and an inlet guide tub, spirally disposed at the inner circumferential surface of the cyclone body, for guiding the liquid from the liquid inlet along the inner circumferential surface of the cyclone body for a predetermined distance, wherein the inlet guide tub has a bottom plate portion projecting horizontally from the inner circumferential surface of the cyclone body and a vertical plate portion parallel to the inner circumferential surface.

DESCRIPTION OF THE PREFERRED EMBODIMENT

Preferred embodiments of the invention will be described with reference to the accompanying drawings.

In the figures, reference numeral 1 represents a liquid passage for feeding therethrough a liquid which contains suspended solids. The term "suspended solids" which is generally represented by initial letters "SS" are generally considered to be those having particle size of 2.0 mm or larger, but in the instant application it is used to represent many kinds of undissolved materials which have a relatively small size. The liquid which contains the above-described suspended solids is used herein to mean primarily the industrial waste liquids but the present invention is not limited to it.

In the illustrated embodiment, the liquid containing the suspended solids is considered to be industrial waste liquid such as waste liquid of car-wash. The liquid passage 1 is connected between a waste liquid generation site such as a waste liquid tank or vessel of an automatic car-wash system and a re-use site of the regenerated waste liquid such as a washing liquid tank of the car-wash system, although it is not specifically shown in the drawings for the purpose of avoiding redundance.

A sedimentation tank 50 is provided at an upstream portion of the liquid passage 1 but at the downstream portion of the waste liquid tank of the aforementioned automatic car-wash system so that mixtures of a large specific gravity such as small stones and lumps of earth and sands are sedimented at the sedimentation tank 50 to be removed. The thus sedimented materials are then taken out of the sedimentation tank 50 by means of a screw feeder 51, whereas the skim or supernatant liquid at the top portion in the tank 50 which still contains therein some suspended solids is taken out by a first pump P1 and then fed at a predetermined flow rate toward a downstream portion of the liquid passage 1.

An injection pipe 2 is connected to a portion of the liquid passage 1 so that air, oxygen gas or ozone gas is injected to the liquid passage 1, and a gas-liquid mixer 10 is connected to the liquid passage 1 at a downstream portion of the injection pipe 2.

It has recently been widely noted to use ozone gas for a water treatment and known that ozone gas mixed into the waste water provides such advantages as germicidal action (sterilization), deodorization, decoloring, decomposition of organic matters, etc. Thus, it is considered to be desirable to add ozone gas for the waste water treatment. However, oxygen gas also has more or less decoloring and deodorization effects and, therefore, oxygen gas or air can be used for the same purposes, and if a chemical reaction is not desirable but must be excluded, use of an air is recommended, wherein the "air" in this case includes the air consisting substantially of nitrogen after oxygen is removed by an oxygen concentration device. If a gas is used for the purpose of removing the suspended solids only, an air can be sufficiently used as the gas for this purpose.

In the illustrated embodiment of the invention, ozone gas generated by an ozonizer 53, more precisely ozone-mixed air or oxygen, is used as the gas. The ozonizer 53 employed herein can discharge at a desired pressure an ozone gas from its discharge port and, therefore, it is sufficient that the discharge port of the ozonizer 53 is simply connected to the liquid passage 1 by the injection pipe 2. If necessary, desired devices such as pump and ejector can be used if an air of low or environmental pressure is supplied into the liquid passage 1.

The ozonizer 53 generally uses a pure oxygen of an oxygen bomb to provide, by a silent discharge method, an ozone-mixed oxygen of 5,000–100,000 ppm. However, in the illustrated embodiment of the invention, an oxygen gas concentrated by a commercially available oxygen concentration apparatus since preparation of the oxygen bomb is somewhat troublesome. By the oxygen concentration apparatus described above which is commercially available as one of medial equipments and apparatus, an air is dried by silica gel or the like, and nitrogen is adsorbed to an adsorbent such as zeolite at a predetermined pressure condition, so that a dried air having an increased oxygen concentration of 40–89% is generated. By use of this dried air, the aforementioned pure oxygen having an ozone concentration of 50,000–100,000 ppm was decreased in its ozone concentration to 20,000–80,000 ppm which, however, would be sufficient for water treatments because a sufficient ozone concentration for the water treatments is supposed to be around 5,000–20,000 ppm.

Figure 1:
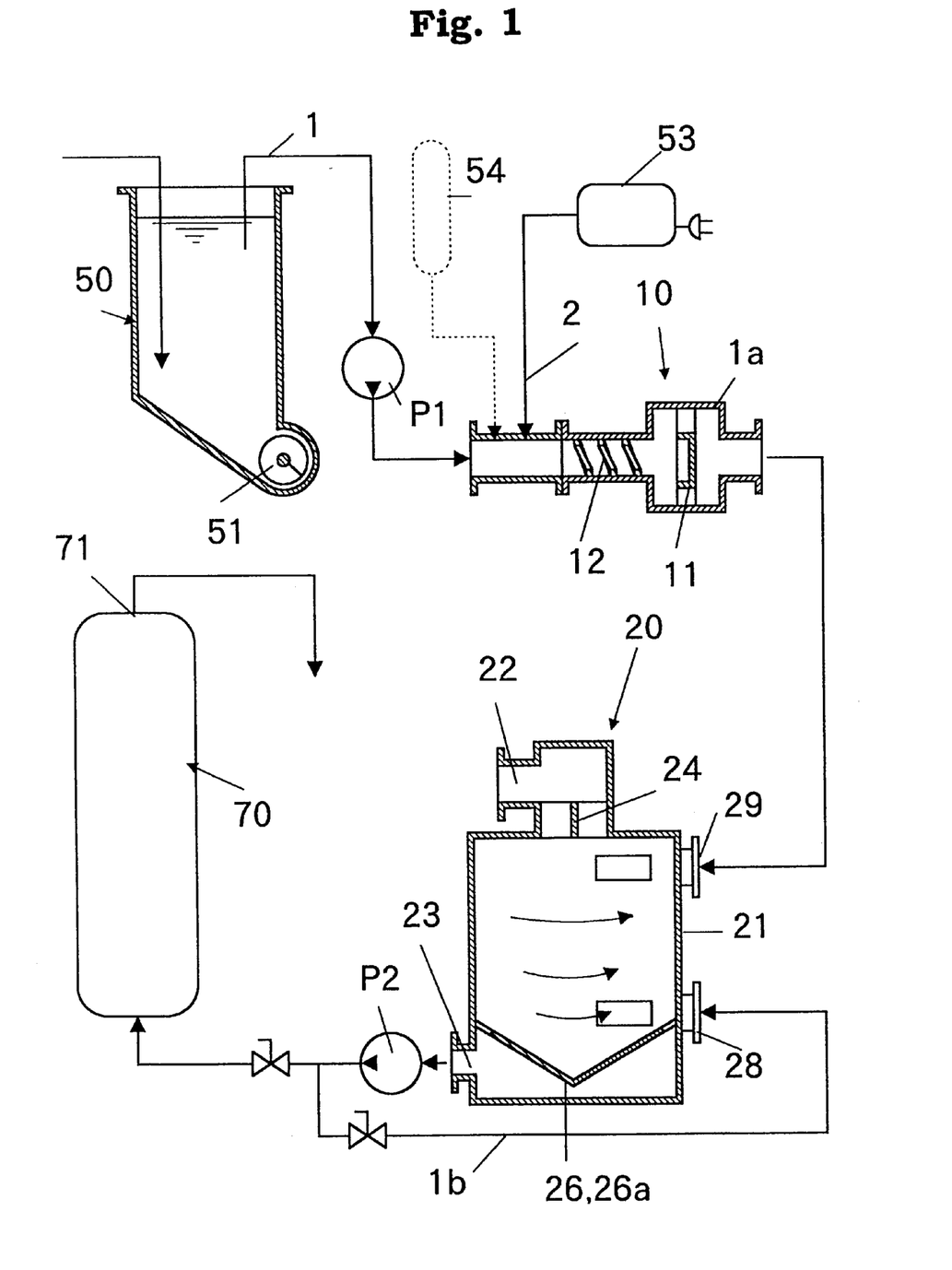
FIG. 1 is a diagrammatic sectional view of a bubble floating type separator according to a preferred embodiment of the present invention.

If necessary, a foaming agent such as soapy water can be supplied, solely or in combination, to the above-described gas by using a foaming agent tank 54 shown in phantom lines in FIG. 1. The foaming agent can be injected into any desired position of the liquid passage 1 if it is supplied to an upstream of a cyclone type bubble separator 20 which will be described presently.

Any type of the conventional gas-liquid mixers can be used as the gas-liquid mixer 20. However, if an ozone gas is used, a care must be taken to use a minimum amount of ozone which is necessary for a reaction by efficient and reliable gas-liquid contact, not only because an ozone gas is expensive due to an expensive ozonizer and aimed gas but also because ozone gas is dangerous and poisonous to human bodies if it is discharged into the atmosphere in an unreacted condition.

In the second and third aspects of the present invention, a diameter-enlarged portion 1a is provided to the gas-liquid mixer 10 at a downstream portion of the injection pipe 2 of the liquid passage 1 so as to increase a mixing efficiency. In the diameter-enlarged portion 1a, a fluid collision plate 11 is provided so that a residual passage area, which has been formed by the fluid collision plate 11, is larger than a sectional area of the liquid passage 1.

In the gas-liquid mixer 10 described above, a static collision system is employed without using a mechanical driving system. The static collision system has advantages of high efficient gas-liquid mixing, simple structure, and small-sizing (or miniaturization) for adapting into the liquid passage 1 but, on the other hand, is supposed to have a problem that large operational power is needed due to a large pressure loss relative to the gas-liquid mixing efficiency.

In the present invention, therefore, reduction of the pressure loss is aimed without reducing an agitation and mixing efficiency, and for this purpose, the diameter-enlarged portion 1a is provided at the downstream portion relative to the injection pipe 2 of the liquid passage 1, and the fluid collision plate 11 is disposed in the diameter-enlarged portion 1a such that the resultant remaining passage area is larger than a sectional area of the liquid passage 1, so that a collision to the fluid collision plate 11 is produced at the portion where inner pressure is lowered due to an orifice effect at the diameter-enlarged portion 1a. Thus, the collision at the fluid collision plate 11 has an effect to restrain an increase in pressure loss.

Figure 2:
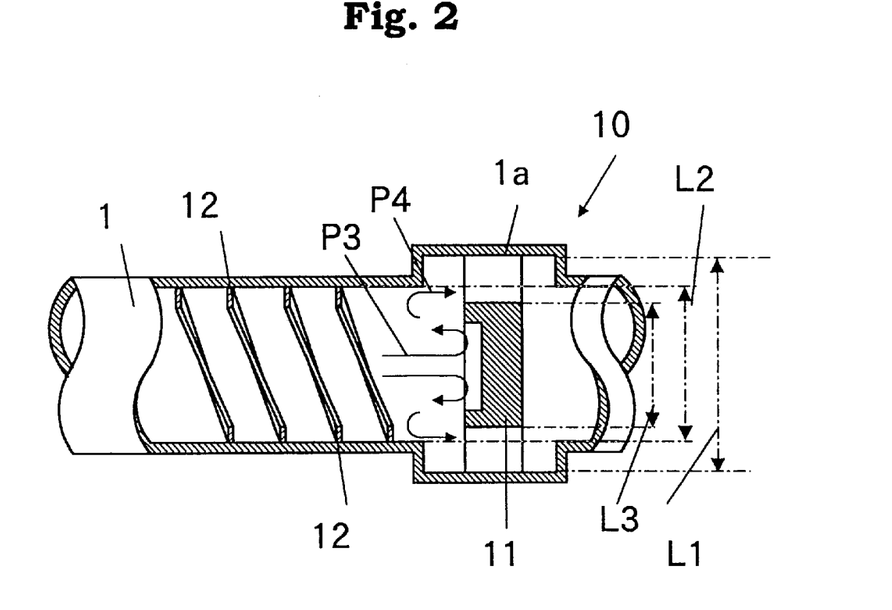
FIG. 2 is a longitudinal sectional view of a gas-liquid mixer applicable to the present invention.

More specifically, in FIG. 2, the dimensions of the parts and elements are determined so that the following formula is satisfied:

$$(\tfrac{1}{2} \cdot L2)^2 \cdot \pi \leq (\tfrac{1}{2} \cdot L1)^2 \cdot \pi - (\tfrac{1}{2} \cdot L3)^2 \cdot \pi$$

wherein:

L1: inner diameter of the diameter-enlarged portion 1a;
L2: inner diameter of liquid passage 1; and
L3: outer diameter of the liquid collision plate 11.

In the illustrated embodiment, the fluid collision plate 11 is of a dish shape having a central recess confronting toward an upstream portion, and the collided liquid forms swirls or turbulent flows as shown by arrows and reference characters P3 and P4 in FIG. 2. Thus, by the collision and turbulent flows described above, and even by additional turbulent flows which will be generated after the flow path is changed in the diameter-enlarged portion 1a to provide other collisions against the inner wall, the liquid is violently mixed and agitated.

In order to repeatedly generate the above-mentioned violent collisions and the turbulent flows, a substantial energy is needed and this necessary energy is represented by a pressure loss in the liquid passage portion. In the present invention, it is designed that these collisions and turbulent flows are generated within the diameter-enlarged portion 1a where a diameter of the liquid passage is increased and, accordingly, an increase of this pressure loss is balanced or offset with the reduction of inner pressure of the passage due to the orifice effect at the diameter-enlarged portion 1a. According to experiments which were made under the conditions described above, the gas was mixed to an extent that the gas turned to an emulsified condition, and the pressure loss before and after the diameter-enlarged portion 1a was as small as 0.5 Kg/cm$^2$ at a flow rate of 3.0 to 3.5 m/sec.

In the illustrated embodiment of the invention, a ribbon screw 12 is disposed in the liquid passage 1 at an upstream portion of the diameter-enlarged portion 1a. The ribbon screw 12 is a sort of a typical static mixer, not shown, and has a screw which is made by twisting a plate having the same width as an inner diameter of the liquid passage 1 so that total amount of the liquid passing through the liquid passage 1 is changed into revolving flows. The typical static mixer, however, has a low mixing efficiency relative to a large pressure loss. Therefore, a strong revolving flow with a high agitating efficiency generates a large centrifugal force, and this centrifugal force accompanied by the revolving flows tend to collect a liquid of heavy weight at the outer circumferential portion of the liquid passage 1 and, on the other hand, a gas of light weight at an axial portion of the flow passage, resulting in troubles of establishing the desired gas-liquid mixture.

In view of the foregoing, an attempt was made to provide the ribbon screw 12 on a part of an outer circumferential side such that it contacts an inner circumferential surface of the liquid passage 1, and a remarkable improvement in the mixing efficiency was recognized. The ribbon screw 12 changes the liquid passing therethrough into revolving flows but will not be effective from a viewpoint of generation of the revolving flows. This ribbon screw 12 serves at first as a baffle board for the liquid passing through the liquid passage 1, and then produces both a pressure-reduced portion and a turbulent flow generation portion near the downstream of the ribbon screw 12 by a flow which passes over the ribbon screw 12. In other words, the flow which passes over the ribbon screw 12 as shown by arrow P1 in FIG. 3 comes into collision with the ribbon screw 12 or otherwish changes its advancing direction to generate a turbulent flow P2 at the downstream of the ribbon screw 12. Further, the ribbon screw 12 blocks a flow of the liquid and, accordingly, only a small amount of the liquid flows adjacent to the downstream side surface of the ribbon screw 12 so that an inner pressure of the passage is locally lowered at a hatched position in FIG. 3. The pressure reduced portion serves to absorb the gas to collect the same at the outer circumferential portion of the liquid passage 1. In the experiment, it was observed that the gas is moved straight along the ribbon screw 12 to the rear portion (downstream side surface) of a starting portion of the ribbon screw 12 located at the upstream portion.

Figure 3:
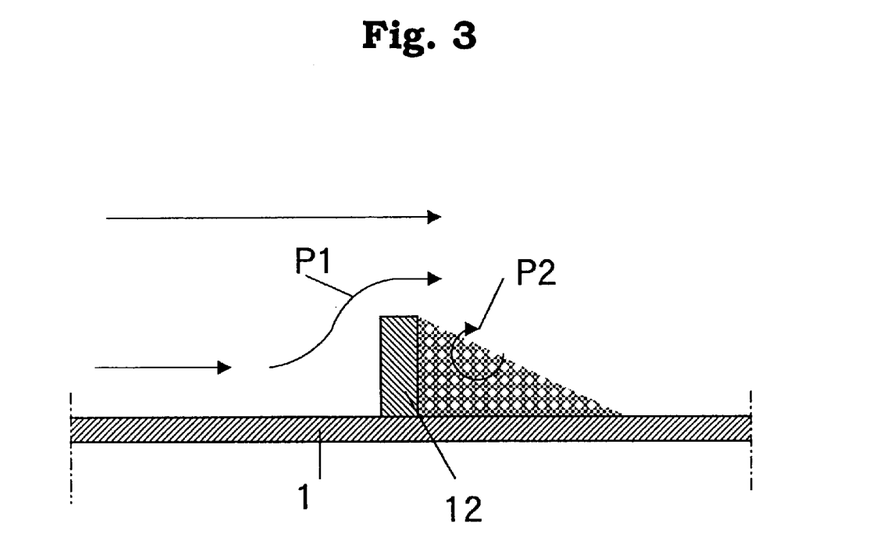
FIG. 3 is an enlarged sectional view of a part of the gas-liquid mixer shown in FIG. 2.

Therefore, the gas is absorbed in the pressure-reduced atmosphere and then agitated and mixed in the turbulent flows so that a reliable mixing can be made. This complete mixing, however, is made at the upstream position of the ribbon screw 12, and the liquid flow, as it goes downstream is guided by the ribbon screw to become entirely revolving flows. When the flow in the liquid passage 1 turns into a revolving flow, a liquid of heavy weight moves toward the outer circumferential portion whereas a gas of light weight toward a central portion. In other words, the gas moves gradually from the outer circumferential portion of the liquid passage 1 to the central portion, and during this movement the gas is mixed with the liquid flow.

In addition to the above, the inner diameter of the liquid passage 1 is considered to be extended, at the position where the ribbon screw 12 is terminated, as much as a constructed portion by the ribbon screw 12 and, therefore, an orifice effect is produced at this extended portion to generate a turbulent flow to thereby provide agitation and mixing effects.

In other words, the ribbon screw 12 serves to provide various kinds of agitation and mixing to ensure a reliable gas-liquid mixture and is a merely local resistive against the smooth flow of the liquid, with the result of less pressure loss in the present invention relative to the conventional static mixers.

Further, at the downstream of the discharging port of the gas-liquid mixer 10 is disposed a cyclone type bubble separator 20 so that an outlet 22 for bubbles which float together with suspended solids is disposed at a central upper portion of the separator 20 and an outlet 23 for the processed liquid is disposed at the lower circumferential portion of the cyclone body 21.

After the liquid is mixed with the gas by means of the gas-liquid mixer 10, the mixture is then left in a large residence vessel to permit the bubbles to rise naturally. For enhancing such natural rising of the bubbles, a foaming agent may be used if desired. However, a natural residence as described above needs a large scaled system such as a large residence vessel and a plenty of time for the process. The method which uses the foaming agent is not always effective because there are cases which do not permit the use of the foaming agent and, moreover, this method is also troublesome. In view of the foregoing, in the present invention, bubbles are separated by the cyclone to thereby establish an effective gas-liquid separation in a short period of time by a relatively simple and small apparatus.

The cyclone type bubble separator 20 has, as described above, the outlet 22 for the bubbles which rise and float together with the suspended solids at the upper central portion thereof, and the outlet 23 at the lower circumferential portion of the cyclone body 21 for discharging therefrom the processed liquid. This cyclone type bubble separator 20 has a similar principle idea as the conventional cyclone classification apparatus but, in the present invention, revolving flows of a suitable strength is generated to collect the liquid at an outer portion of the revolving flows and, on the other hand, the bubbles at an upper portion of the axial area so that the bubbles which float together with the suspended solids are discharged out of the outlet 22 whereas the liquid from which the bubbles have been removed are discharged out of the outlet 23 at the lower portion.

This operation can be carried out at natural condition and under a normal pressure by controlling the inlet-outlet volumes of the cyclone type bubble separator described above.

The cyclone type bubble separator 20 in the third aspect of the invention has a liquid inlet 29 at an upper circumferential portion of the cylindrical cyclone body 21 for supplying a liquid in to a tangential inner portion of the cyclone body 21, a block plate 24 for blocking a revolving flow and a bubble outlet 22 at a top central portion of the cyclone body 21, an inner bottom plate 26 at a lower inner portion of the cyclone body 21 with a gap provided relative to the inner surface of the cyclone body 21, and a liquid outlet 23 on an inner circumference of the cyclone body 21 at a lower portion of the inner bottom plate 26 so that the processed liquid is discharged therethrough.

Generally, a cyclone body has a cylindrical upper portion and an inverted conical lower portion, but in the present invention, the cyclone body 21 has a cylindrical shape having upper and lower ends of the same diameter. In other words, at the upper circumferential portion of the cyclone body 21, when a liquid is injected at a predetermined flow rate to a tangential inner portion of the cyclone body 21, the injected liquid is naturally turned into a revolving flow and, at the same time, the power of the revolving flow is decreased at the lower portion of the cyclone body 21. In the conventional technique, therefore, the cyclone body is designed such that its diameter becomes gradually smaller towards its lower end so that a revolving flow does not decrease its power. By contrast, in the persent invention, a power reducing portion of the revolving flow is positively formed and the liquid outlet 23 for the processed liquid is provided at this place.

Further, in order to confine the power reducing portion in the present invention, the inner bottom plate 26 is disposed in the inner lower portion of the cyclone body 21 with a space formed relative to the inner circumferential surface of the cyclone body 21, and the liquid outlet for the processed liquid is disposed on the lower circumferential surface than the position of the inner bottom plate 26. Since the bubbles are moved toward the central portion and the liquid which is heavier than the bubbles is moved to the outer circumferential portion, the liquid containing no bubbles will be passed through the portion which is lower than the outer circumferential gap of the inner bottom plate 26 and then discharged out of the liquid outlet 23.

The inner bottom plate 26 is inverted umbrella shaped in the illustrated embodiment which can be modified to a planar disc shape so that it is coupled to the inner circumferential surface of the cyclone body 21 by means of a connecting plate (now shown).

The bubbles collected at the central portion by the revolving flow will be increased both in its volume and number if they are left in the stream of the revolving flow, and then sometimes prevent further collection of the bubbles. Thus, the block plate 24 for blocking the revolving flows and the bubble outlet 22 are provided at the central top portion of the cyclone body 21 to thereby partly or locally stop the revolving flows so that the bubbles are allowed to rise and float on the liquid surface and the floated bubbles are discharged out of the outlet 22.

The block plate 24 described above is made of a cross-shaped plate and dipped into the liquid so that the revolving flows are brought into collision with the block plate 24 to stop the revolving flows. Many modifications can be made to the shape of the block plate 24 by, for example, applying a single, radially extending longitudinal plate, so long as it can stop the revolving flows.

In the fourth aspect of the invention wherein the above-described cyclone bubble separator 20 is the most important subject matter, another liquid inlet 29 is provided, at an upper circumferential portion of the cylindrical cyclone body 21, for feeding further a liquid containing bubbles therein to the liquid which contains suspended solids in the tangential inner portion of the cyclone body 21. Thus, the cyclone body 21 and the liquid flowing thereinto from the liquid inlet 29 are substantially similar with those of the previous aspect of the invention.

Similar to the structure in the third aspect of the invention, a blocking plate 24 of the revolving flow and a bubble outlet 22 are provided at a top central portion of the cyclone body 21 in this fourth aspect of the invention.

Further, in the fourth aspect of the invention, a predetermined gap is formed relative to the inner surface of the cyclone body 21 at a lower inner portion of the cyclone body 21, and an inner bottom plate 26a of an inverted umbrella-shape with the central portion projecting downwardly is disposed, and a liquid outlet 23 is disposed at a lower circumferential portion of the cyclone body 21, at the lower position than the inner bottom plate 26a, for discharging the processed liquid.

In the fourth aspect of the invention, the inner bottom plate 26a of an inverted umbrella-shape is provided and revolving flows are generated in which a centrifugal force will be naturally generated in the revolving flows. The centrifugal force will permit the water or liquid having a larger specific gravity to advance more rapidly toward the outer circumference of the cylindrical portion than the bubbles having smaller specific gravity. As a result, the bubbles of less specific gravity are collected at a central portion where substantially no centrifugal force is effected upon. In the cyclone body 21, there are flows which advance from the upper portion to the lower portion, and the revolving flows will receive a frictional resistance against an inner wall of the cyclone body 21 and, therefore, the revolving flows will be damped as they go down toward the lower portion of the cyclone body 21.

Since the bubbles are moved to the central portion and the liquid which is heavier than the bubbles is moved to the outer circumferential portion, the liquid containing no bubbles therein are fed from the gap at the outer circumferential portion of the bottom plate 26 to the lower portion and then discharged out of the processed liquid outlet 23. This structure is similar to that of the previously disclosed third aspect of the invention, and yet in this fourth aspect of the invention, the inner bottom plate 26 is designed to be of inverted-umbrella shape, the aforementioned damping of the revolving flows is not generated at the lower portion in the cyclone body 21, either.

The distance between the axis and the inverted-umbrella shaped inner bottom plate 26a is gradually reduced as it goes down to the lower end and, accordingly, the diameter of the revolving flows is reduced to thereby compensate the damping of a power of the revolving flows. A damping, more or less, of the revolving flows will be inevitable in the inner bottom plate 26a but a suitable revolvin flows are still maintained. Thus, if a centrifugal force of a predetermined level is still affected, the bubbles are collected at the central portion within a short period of time and, therefore, a constant bubble separation, as a whole, can be established at the both upper and lower portions of the cyclone body 21.

In the fifth aspect of the invention, there are provided a liquid inlet 29, at an upper circumferential portion of the cyclone body 21, for feeding a liquid containing therein the suspended solids and a liquid containing therein bubbles towards a tangential inner portion of the cyclone body 21, a revolving flow block 24 for blocking a revolving flow and a bubble outlet 22 at a top central portion of the cyclone body 21, an inner bottom plate 26a at a lower inner portion of the cyclone body 21 with a predetermined gap relative to an inner circumferential surface of the cyclone body 21. The inner bottom plate 26a has an inverted-umbrella shape with its central portion projecting downwardly. Further, there is provided a liquid outlet 23, at a circumferential surface below the inner bottom plate 26a, for discharging the processed liquid. This structure will be substantially similar to that of the previously mentioned fourth aspect of the invention.

In this fifth aspect of the invention, a circulation passage 1b is connected to the separator 23 through a pump means P2 for circulating a part of the processed liquid, and a second inlet 28 is provided at an immediate above portion of the inner bottom plate 26a at the circumferential surface of the cyclone body 21, and connected to a downstream end of the circulation passage so that the processed liquid is fed to the tangential inner portion of the cyclone body 21.

Namely, in the fifth aspect of the invention, the second inlet 28 is provided at the portion lower than the position of the liquid inlet 29. In the general cyclone classification apparatus, a specific gravity separation is established by a centrifugal force of the revolving flows and, therefore, higher speed of the revolving flows have been considered to effect more desirably. In the present invention, however, it is not necessary that the revolving flows have so high speed because the gases are generally separated in the condition of bubbles and because the present invention is not aimed at generally known specific gravity classification or gas-liquid separation, either. On the other hand, it is likely that very strong revolving flow will collapse the bubbles, with the result of failure in collection of the suspended solids due to the damage of the collecting function of the bubbles.

Accordingly, speed or flow rate of the revolving flows are controlled to some extent but, on the other hand, if the flow rate is low, there is a disadvantage that the revolving flows do not extend to the lower portion of the cyclone body 21. Further, in case of the liquid which contains a number of bubbles, the revolving flows will sometimes "slide" or "rotate freely" in the upper and lower portions, with the result that the revolving flows are not delivered to the lower portions. In the present invention, therefore, a damping of the revolving flow at the lower portions are prevented.

In the fifth aspect of the present invention, the circulation passage 1b is connected to the liquid outlet 23 through the pump device P2, and the downstream end of the circulation passage 1b is connected to the second inlet 28 so that a portion of the processed liquid is used to prevent a damping of the revolving flow at the lower portion of the cyclone body 21.

In the sixth aspect of the invention, the liquid inlet 29 is provided at the circumferential upper portion of the cylindrical cyclone body 21 for feeding a liquid containing bubbles to the liquid which contains the suspended solids at the tangential inner portion of the cyclone body 21. At the central top portion of the cyclone body 21, there are provided a revolving flow block plate 24 and bubble outlet 22, and the inner bottom plate 26 is provided in the lower portion of the cyclone body 21 with a gap relative to the inner circumferential surface of the cyclone body 21. This structure is substantially similar to that of the previous-mentioned third aspect of the invention.

In the sixth aspect of the invention, the second liquid inlet 28 is provided, above the inner bottom plate 26, at the circumferential lower portion of the cyclone body 21 so that the liquid is supplied into the tangential inner portion of the cyclone body 21.

By providing the second inlet 28, a damping of the revolving flows at the lower portion of the cyclone body 21 is prevented. The liquid which is supplied into this second inlet 28 in the previous (fifth) aspect of the invention is the processed liquid, which, however, may be replaced by other liquid such as a circulating water or other desired liquid.

Figure 5:
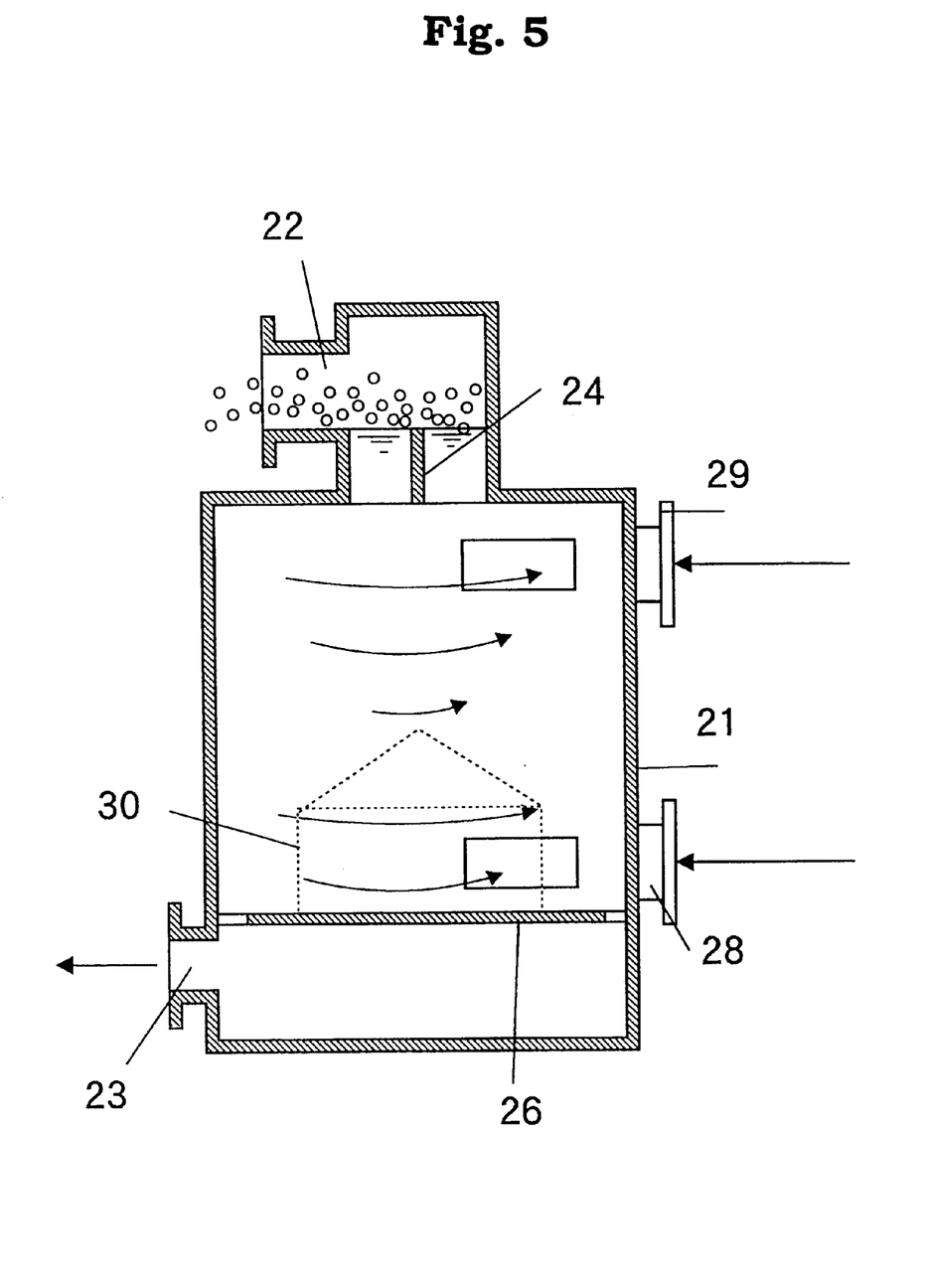
FIG. 5 is a sectional view of the bubble separator according to a further embodiment of the invention.

The inverted-umbrella shaped inner bottom plate 26a which is used in the fifth aspect of the invention can be modified into a planar-shaped structure as shown in FIG. 5 if a desired revolving flow can be generated by supplying a liquid from the second inlet 28. Further, if necessary and/or desired, a tubular portion 30 can be provided to decrease a volume or space of the revolving flows. A liquid outlet 23 which is similar to the liquid outlet 23 in the previous aspects is provided at the lower circumference of the cyclone body 21 at the portion lower than the position of the inner bottom plate 26a.

Figure 6:
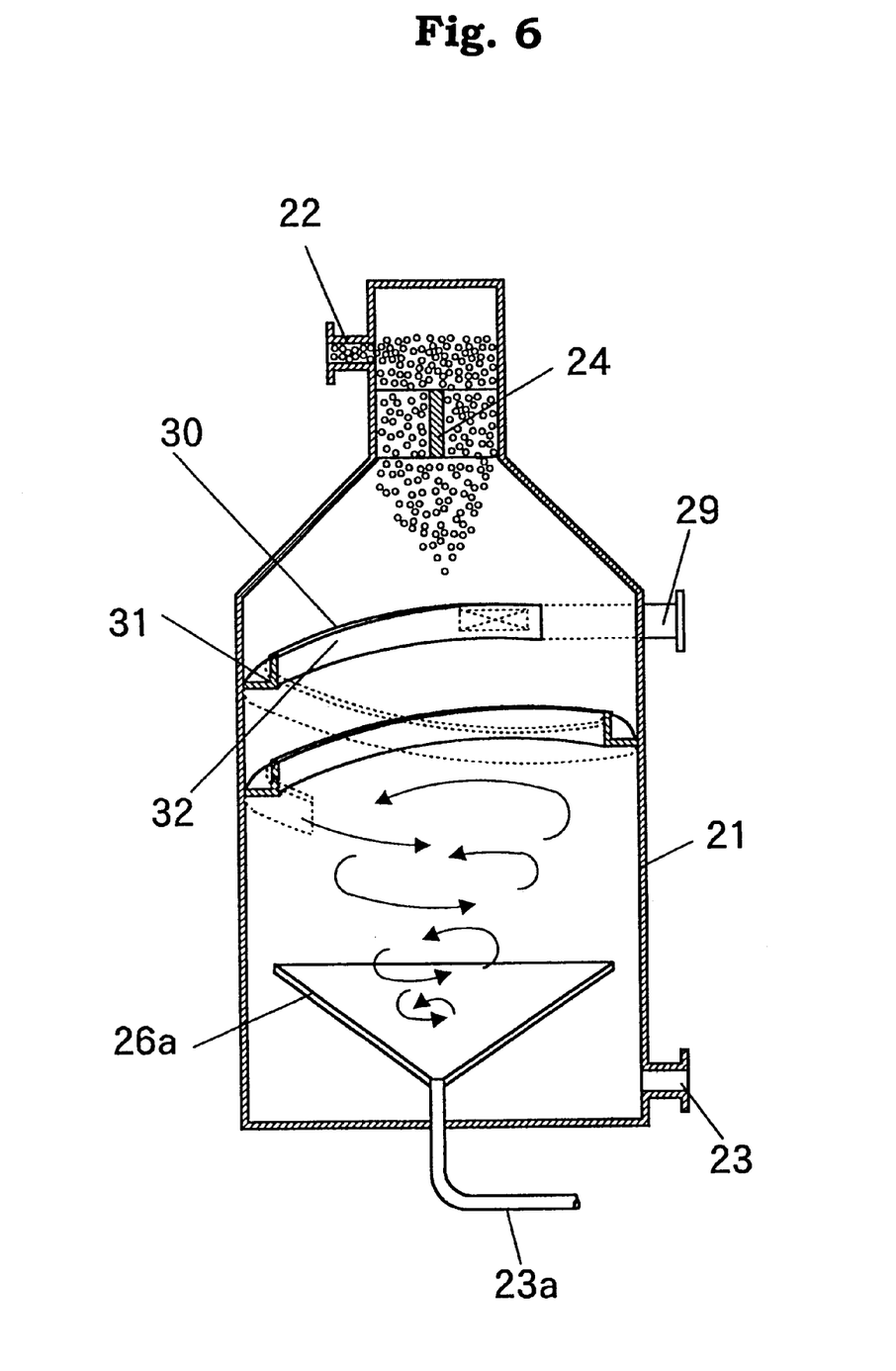
FIG. 6 is a sectional view of the bubble separator according to another embodiment of the invention.

With reference to FIG. 6 which shows a seventh aspect of the invention, a cylindrical cyclone body 21 has a liquid inlet 29, at an upper circumferential portion of the cyclone body 21, for feeding a liquid which contains therein suspended solids and a liquid which contains therein bubbles towards a tangential inner portion of the cyclone body 21. Further, the cyclone body 21 has a revolving flow block 24 for blocking a revolving flow and a bubble outlet at a top central portion, an inner bottom plate 26 at a lower inner portion of the cyclone body 21 with a predetermined gap relative to an inner circumferential surface of the cyclone body 21, a liquid outlet 23, at a circumferential surface below the inner bottom plate 26, for discharging the processed liquid, and an inlet guide tub 30 which is spirally disposed at the inner circumferential surface of the cyclone body 21 for guiding the liquid from the liquid inlet 29 along the inner circumferential surface of the cyclone body 21 for a predetermined distance.

The inlet guide tub 30 has a bottom plate portion 31 projecting horizontally from the inner circumferential surface of the cyclone body 21 and a vertical plate portion 32 which is formed parallel to the inner circumferential surface of the cyclone body 21.

In the seventh aspect of the invention described above with reference to FIG. 6, the inlet guide tub 30 serves to limit the revolving flows, which are accompanied by the flow-in of the liquid at an upper portion of the cyclone body 21, to be located within the inlet guide tub 30, and revolving flows are formed so that they are accompanied by revolution of the entire liquid at the lower portion of the cyclone body 21 at the inner region of the vertical plate portion 32 of the inlet guide tub 30. Therefore, a stronger revolving flow is generated within the inlet guide tub 30 whereas a relatively weak revolving flow is generated outside the inlet guide tub 30.

By the strong revolving flow in the inlet guide tub 30, the liquid is moved toward the cyclone body 21 by the strong centrifugal force and, on the other hand, the bubbles are moved toward the vertical plate 32, so that an efficient separation of the bubble is established successfully.

The bubbles which have been separated in the inlet guide tub 30 are guided by the vertical plate portion 32 to move upward and then run into the revolving flow positioned inside the inlet guide tub 30. Since the revolving flow at the inside portion of the inlet guide tub 30 is relatively weak and it has a relatively sufficient floating efficiency, less amount of the bubbles will be captured to be fed downwardly by the revolving flow.

In FIG. 6, reference numeral 23a represents a discharge port for discharging a small amount of waste liquid. The discharge portion 23a also serves to discharge a liquid which still contains bubbles therein when a bubble separation is not complete for some reasons.

In FIG. 1, an activated carbon vessel 70 can be provided selectively in accordance with necessity. With such an activated carbon vessel 70 of a large scale and by using ozone as the gas, industrial waste water can be purified. It has been known that the combination of ozone and activated carbon will permit the ozone to dissolve organic materials to prevent clogging of the activated carbon and also permit the activated carbon to dissolve an excessive ozone and, therefore, such combinational use has been used generally and extensively. Recently, studies have been reported that ozone is useful not only as an oxygen source of an activated sludge process by an activated carbon but also for growth of aerobic bacterial by sterilizing anaerobic bacteria.

In FIG. 1, reference numeral 71 represents a liquid outlet for the processed liquid, which is installed in combination with the re-using station of the waste water such as the aforementioned water vessel.

According to the present invention, gas is mixed with a liquid and then the mixed gas is separated as bubbles. Thus, the bubbles collect suspended solids to exclude the same from the liquid and, accordingly, a separator of a simple structure can be provided which can exclude the suspended solids from the liquid by a simple use of the gas.

Further, the separator of the present invention can be of simple structure because it is formed mainly of the gas-liquid mixer 10 and the cyclone type bubble separator 20 and, at the same time, it can be operated easily since the controlling portion thereof is made of only pump means P1 and P2.

In the second aspect of the present invention described above, the gas-liquid mixer 10 is provided with the fluid collision plate 11 in the diameter enlarged portion 1a. This structure, in addition to the embodiment of the first aspect of the invention, permits an efficient gas-liquid mixing with less pressure loss.

In the third aspect of the invention, the cyclone type bubble separator 20 is used, which permits a high operability at a normal pressure condition with less operational power.

Figure 4:
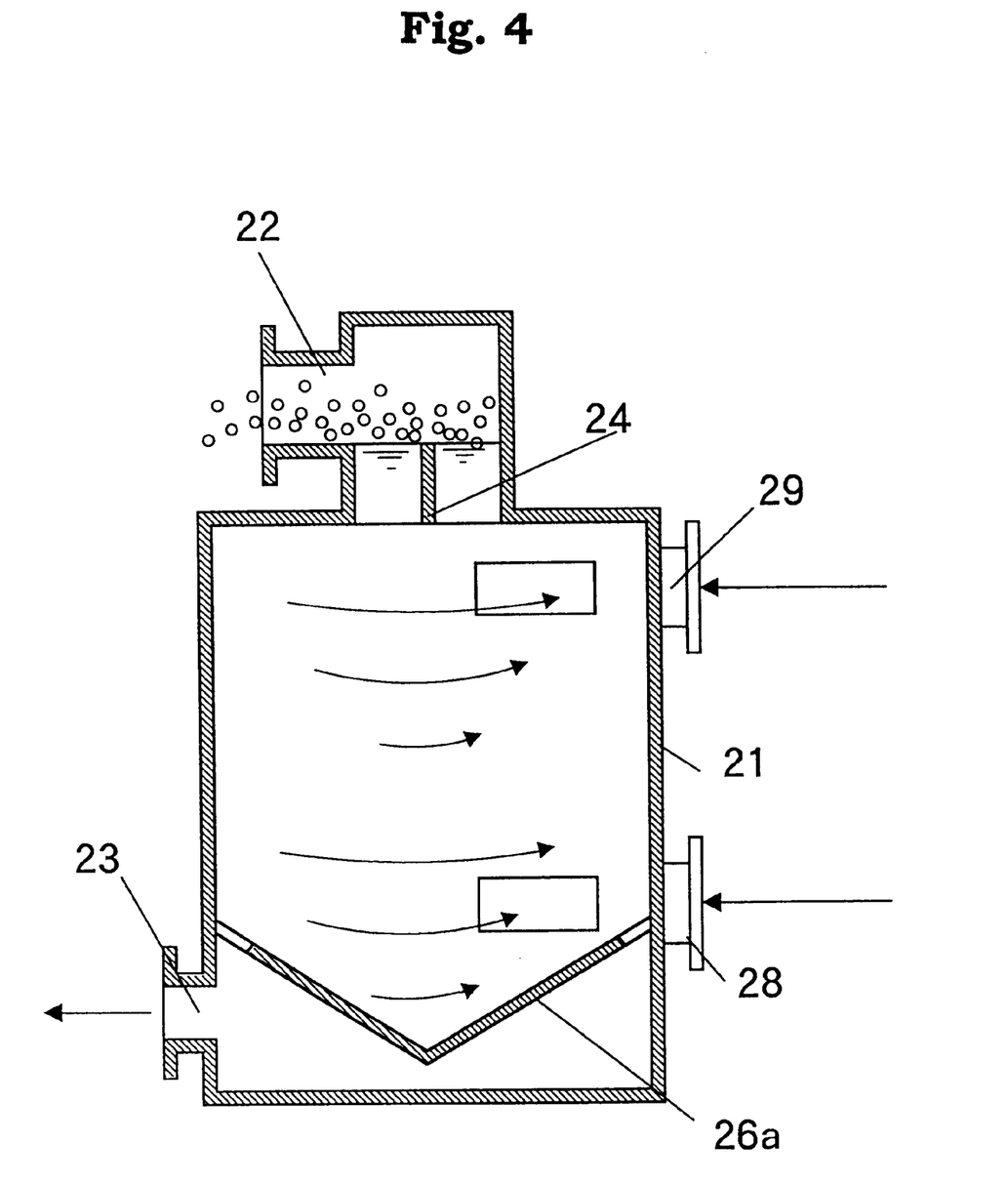
FIG. 4 is a sectional view of the bubble separator according to another embodiment of the invention.

In the fourth aspect of the invention, an inverted umbrella-shaped (that is, V-shaped in cross section as seen in FIGS. 1 and 4) inner bottom plate 26 is provided in the cyclone body. This permits to maintain revolving flows of a suitable flow rate for bubble separation at the entire regions of the upper and lower portions in the cyclone type bubble separator 20. Thus, an efficient bubble separation can be realized.

Further, in the fifth aspect of the invention, the revolving flows can be generated at both upper and lower portions of the cyclone body 21 and, therefore, desired revolving flows having a suitable flow rate for the bubble separation operation can be achieved at the upper and lower portions.

In the sixth aspect of the invention, a power of the revolving flows is biased and desired revolving flows for collecting the bubbles can be maintained at the entire region of the upper and lower portions in the cyclone body 21 and, therefore, an efficiency of bubble separation and suspended solids separation can be improved.

Although the present invention has been described with reference to the preferred embodiments thereof, many modifications and alterations can be made within the scope of the invention described in the claims attached herewith.

What is claimed is:

1. A bubble floating type separator comprising:

a cylindrical cyclone body, a liquid inlet, at an upper circumferential portion of said cyclone body, for feeding a liquid containing therein suspended solids and a liquid containing therein bubbles towards a tangential inner portion of said cyclone body, a revolving flow block for blocking a revolving flow and a bubble outlet at a top central portion of said cyclone body, an inner bottom plate at a lower inner portion of said cyclone body with a gap defined between an outer edge of the bottom plate and an inner circumferential surface of said cyclone body for flow communication therethrough, said inner bottom plate having an inverted-umbrella shape with its central portion projecting downwardly, and a liquid outlet, at a circumferential surface below said inner bottom plate, for discharging the processed liquid.

2. A bubble floating type separator comprising:

a cylindrical cyclone body, a liquid inlet, at an upper circumferential portion of said cyclone body, for feeding a liquid containing therein suspended solids and a liquid containing therein bubbles towards a tangential inner portion of said cyclone body, a revolving flow block for blocking a revolving flow and a bubble outlet at a top central portion of said cyclone body, an inner bottom plate at a lower inner portion of said cyclone body with a gap defined between an outer edge of the bottom plate and an inner circumferential surface of said cyclone body for flow communication therethrough, said inner bottom plate having an inverted-umbrella shape with its central portion projecting downwardly, and a liquid outlet, at a circumferential surface below said inner bottom plate, for discharging the processed liquid, and a circulation passage connected to said liquid outlet through a pump means for circulating a part of the processed liquid; and a second inlet, at a portion of said cyclone body above said inner bottom plate at the circumferential surface of the cyclone body, and connected to a portion of said circulation passage downstream of said liquid outlet so that the processed liquid is fed to said tangential inner portion of said cyclone body.

3. A bubble floating type separator comprising:

a cylindrical cyclone body, a liquid inlet, at an upper circumferential portion of said cyclone body, for feeding a liquid containing therein suspended solids and a liquid containing therein bubbles towards a tangential inner portion of said cyclone body, a revolving flow block for blocking a revolving flow and a bubble outlet at a top central portion of said cyclone body, an inner bottom plate at a lower inner portion of said cyclone body with a gap defined between an outer edge of the bottom plate and an inner circumferential surface of said cyclone body for flow communication therethrough, a second liquid outlet, at a lower circumferential portion of said cyclone body and at a portion of said cyclone body above said inner bottom plate, for feeding the liquid to the inner tangential portion of said cyclone body, and a liquid outlet, at a circumferential surface below said inner bottom plate, for discharging the processed liquid.

4. A bubble floating type separator comprising:

a cylindrical cyclone body, a liquid inlet, at an upper circumferential portion of said cyclone body, for feeding a liquid containing therein suspended solids and a liquid containing therein bubbles towards a tangential inner portion of said cyclone body, a revolving flow block for blocking a revolving flow and a bubble outlet at a top central portion of said cyclone body, an inner bottom plate at a lower inner portion of said cyclone body with a gap defined between an outer edge of the bottom plate and an inner circumferential surface of said cyclone body for flow communication therethrough, a liquid outlet, at a circumferential surface below said inner bottom plate, for discharging the processed liquid, and an inlet guide tub, spirally disposed at the inner circumferential surface of said cyclone body, for guiding the liquid from said liquid inlet along the inner circumferential surface of said cyclone body for a predetermined distance, wherein said inlet guide tub has a bottom plate portion projecting horizontally from the inner circumferential surface of said cyclone body and a vertical plate portion parallel to said inner circumferential surface.

* * * * *

UNITED STATES PATENT AND TRADEMARK OFFICE
CERTIFICATE OF CORRECTION

PATENT NO. : 5,928,509
DATED : July 27, 1999
INVENTOR(S) : HIKOROKU SUGIURA

It is certified that error appears in the above-identified patent and that said Letters Patent is hereby corrected as shown below:

Column 15, claim 2, line 21, after "downwardly," "and" should be deleted.

Column 15, claim 2, line 24, after "liquid," "and" should be deleted.

Column 16, claim 3, line 6, "outlet" should read --inlet--.

Signed and Sealed this

Twenty-first Day of December, 1999

Attest:

Q. TODD DICKINSON

*Attesting Officer*     *Acting Commissioner of Patents and Trademarks*